Patented Sept. 1, 1931

1,821,043

UNITED STATES PATENT OFFICE

KLAUS WEINAND, OF FLITTARD, NEAR COLOGNE-ON-THE-RHINE, GERMANY, ASSIGNOR TO GENERAL ANILINE WORKS, INC., OF NEW YORK, N. Y., A CORPORATION OF DELAWARE

HYDROARYL AMINO ANTHRAQUINONE COMPOUNDS AND PROCESS OF MAKING THE SAME

No Drawing. Application filed August 18, 1926, Serial No. 130,111, and in Germany November 23, 1925.

My invention relates to amino-anthraquinone compounds in which the amino groups are substituted by hydro-aromatic radicles.

Arylamino-anthraquinone compounds are of tremendous importance in the dyestuff industry, some of the fastest and most brilliant wool colors being sulfonated arylamino-anthraquinones.

I have shown in U. S. Patent No. 1,735,147 dated November 12, 1929 (application Ser. No. 130,112, filed August 18, 1926) that by replacing the aryl-substituent in homonuclear 1-amino-4-arylamino-anthraquinone sulfonic acids, that means 1-amino-4-arylamino-anthraquinone-2-or 3-sulfonic acids, by an aliphatic open carbon chain, or alkyl radicle the shade of the original blue dyestuff is considerably improved, becoming much brighter and clearer. The superior light fastness of wool dyeings made with 1-amino-4-arylamino-anthraquinone sulfonic acids is however decreased in the case of the corresponding alkyl substituted dyestuff.

I have now found that when hydro-aryl-amines are allowed to react in presence of a copper catalyst upon 1-amino-4-halogeno-2-anthraquinone sulfonic acids, 1-amino-4-hydro-aryl-amino-2-anthraquinone sulfonic acids are obtained. These novel dyestuffs dye animal fibres blue shades which show the superior light fastness of the corresponding aryl compounds as well as the brightness and clearness of the dyeings made with the alkyl compounds.

I have further found that, quite generally, hydro-arylamino-anthraquinone compounds are distinguished from the corresponding aryl compounds by very marked features, such as greater clearness and brightness of the shade of the dyestuff made out of them, while the novel products still possess the same valuable fastness to light. Such hydro-arylamino-anthraquinone compounds have therefore proven to be exceedingly valuable in the production of novel dyestuffs.

The term hydro-aryl as used herein is meant to cover the products obtained by hydrogenating compounds of the benzene and naphthalene series, as well as their derivatives such as hydroxy compounds, ethers and esters etc.

My novel hydro-arylamino-anthraquinone compounds can be produced by substantially the same reactions which lead to arylamino-anthraquinones, such as condensation of hydroxy- or halogeno- anthraquinones with hydroarylamines. It is however remarkable that the hydroarylamines, which are usually much more basic than the corresponding arylamines, react substantially only with the halogen atom when allowed to react in presence of a copper catalyst upon halogeno-anthraquinone sulfonic acids, such as 1-amino-4-halogeno-2-sulfonic acid, and that the sulfo groups are not attacked under the conditions whereas the halogen atoms are practically completely replaced by a hydro-aryl-amino-residue.

Hydro arylamino-anthraquinone compounds containing sulfo groups in the nucleus can be used directly as dyestuffs. Unsulfonated hydroarylamino-anthraquinones are preferably made soluble for use in the dyeing of animal fibres. Hydroxy-hydroarylamino-anthraquinones react with sulfuric acid to form sulfo esters which are easily water soluble. Hydro arylamino-anthraquinones containing an aryl amino group can be easily sulfonated, the sulfo group entering most probably into the aryl residue; in this manner water soluble dyestuffs are also produced.

The following examples will further illustrate my invention, the parts being by weight.

*Example 1.*—20 parts 1-amino-4-bromo-2-anthraquinone sulfonic acid, 60 parts hexahydroaniline, 12 parts soda ash, 1 part copper sulfate are dissolved in 100 parts alcohol and 900 parts water and heated for two hours to boiling temperature. The solution turns blue. The excess hexahydroaniline and the alcohol are steamed off and the residue salted out. The 1-amino-4-hexahydroanilino-2-anthraquinone sulfonic acid separates and is obtained as water soluble blue crystals. It dyes wool clear, intense blue shades of excellent fastness to light. It has most probably the formula:

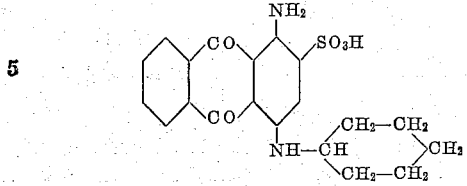

Example 2.—20 parts 1-amino-4-bromo-2-anthraquinone sulfonic acid, 60 parts hexahydro-o-toluidine, 10 parts soda ash, 1 part copper sulfate, 100 parts pyridine and 900 parts water are heated for 2–3 hours to boiling temperature. The dyestuff forms quickly and is isolated as described in Example 1. The 1-amino-4-hexahydro-o-toluido-2-anthraquinone sulfonic acid is obtained as greenish-blue water soluble crystals, and dyes wool very clear greenish-blue shades, fast to light.

Example 3.—10 parts leuco-1-4-dihydroxy anthraquinone are dissolved at about 100° C. in 100 parts o-amino-cyclo-hexanol and kept at this temperature for about one hour, the reaction mass is then diluted with 100 parts alcohol, crystals separate and are filtered off. They represent the 1-4-di-o-hydroxy-cyclohexylamino-anthraquinone of the most probable formula:

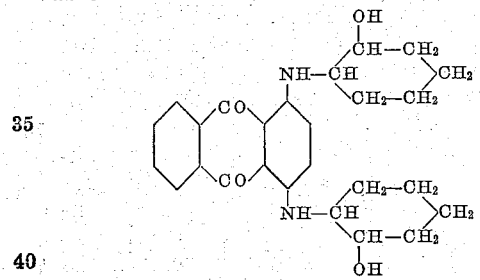

The hydroxyl groups in the hydroaryl residue are esterified when the above compound is treated with sulfuric acid. The so obtained sulfuric acid ester of the 1-4-di-o-hydroxy - cyclohexylamino - anthraquinone is easily soluble in water and dyes wool particularly clear blue shades of good fastness to light.

Example 4.—10 parts hexahydroaniline, 50 parts pyridine, 50 parts water and 10 parts 1-methoxy-4-toluido-anthraquinone are heated for about two hours under pressure to a temperature of 125° C. The 1-hexahydroanilino-4-toluido-anthraquinone formed is filtered off after cooling. It is a blue crystalline powder and has most probably the formula:

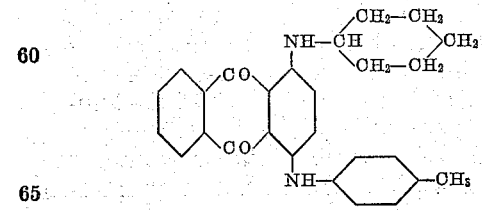

By treatment with sulfuric acid a sulfonic acid is obtained which dyes wool exceedingly clear, greenish-blue shades of good light fastness.

I claim:

1. As new products amino-anthraquinone compounds, the distinctive characteristic of which is that one of the amine hydrogens is substituted by a hydroaryl radicle.

2. As new products 1-amino-4-hydroaryl amino-2-anthraquinone sulfonic acids, which are water soluble, blue, crystalline substances, dyeing wool exceedingly clear, blue shades, fast to light.

3. As a new product the 1-amino-4-hexahydroanilino-2-anthraquinone sulfonic acid, which crystallizes in blue needles, is soluble in water with a blue color, dyes wool exceedingly clear, blue shades fast to light and has most probably the formula:

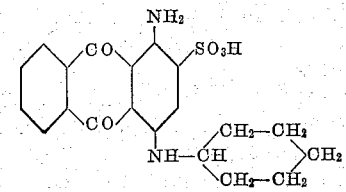

4. The process of reacting in presence of a copper catalyst with hydroarylamines upon 1-amino-4-halogeno-2-anthraquinone sulfonic acids.

5. The process of reacting in presence of a copper catalyst with hydroarylamines upon 1-amino-4-halogeno-2-anthraquinone sulfonic acids, in which the halogen is one of the group comprising chlorine and bromine.

6. The process of reacting in presence of a copper catalyst with a hydroarylamine upon 1-amino-4-bromo-2-anthraquinone sulfonic acid.

7. The process of heating a water solution of 1-amino-4-bromo-2-anthraquinone sulfonic acid with hexahydroaniline and copper sulfate.

8. As new products, 1-4-diaminoanthraquinone compounds in which a hydrogen atom of at least one amino group is substituted by a hydroaryl radicle.

9. As new products, 1-amino-4-hydroarylamino-anthraquinone compounds containing a homonuclear sulfonic acid group.

In testimony whereof I affix my signature.

KLAUS WEINAND.